United States Patent
Gan et al.

(10) Patent No.: US 6,743,550 B2
(45) Date of Patent: Jun. 1, 2004

(54) DOUBLE CURRENT COLLECTOR CATHODE DESIGN USING CHEMICALLY SIMILAR ACTIVE MATERIALS FOR ALKALI METAL ELECTROCHEMICAL

(75) Inventors: Hong Gan, East Amherst, NY (US); Esther S. Takeuchi, East Amherst, NY (US)

(73) Assignee: Wilson Greatbatch Ltd., Clarence, NY (US)

( * ) Notice: Subject to any disclaimer, the term of this patent is extended or adjusted under 35 U.S.C. 154(b) by 225 days.

(21) Appl. No.: 10/000,884

(22) Filed: Nov. 15, 2001

(65) Prior Publication Data

US 2002/0098411 A1 Jul. 25, 2002

Related U.S. Application Data

(60) Provisional application No. 60/249,688, filed on Nov. 17, 2000.

(51) Int. Cl.$^7$ ................................................ H01M 4/50
(52) U.S. Cl. .................. 429/224; 429/231.5; 429/219; 429/231.9; 429/128; 429/245; 429/330
(58) Field of Search ................................. 429/224, 219, 429/231.5, 218.1, 231.95, 245, 330, 128, 231.9

(56) References Cited

U.S. PATENT DOCUMENTS 6,551,747 B1 * 4/2003 Gan ........................... 429/245

* cited by examiner

Primary Examiner—Laura Weiner
(74) Attorney, Agent, or Firm—Micheal F. Scalise

(57) ABSTRACT

The present invention relates to a new sandwich cathode design having two cathode active materials provided on opposite sides of a current collector. The respective active materials are similar in terms of, for example, their rate capability, their energy density, or some other parameter. However, one material may have an advantage over the other in one characteristic, but is disadvantageous in another. The cathode is built in a sandwich configuration having a first one of the active materials sandwiched between two current collectors. Then, the second active material is provided in contact with at least the other side of one of the current collectors, and preferably facing the anode. An exemplary cathode has the following configuration: $MnO_2$/current collector/SVO/current collector/$MnO_2$.

28 Claims, No Drawings

DOUBLE CURRENT COLLECTOR CATHODE DESIGN USING CHEMICALLY SIMILAR ACTIVE MATERIALS FOR ALKALI METAL ELECTROCHEMICAL

CROSS REFERENCE TO RELATED APPLICATION

This application claims priority based on provisional application Serial No. 60/249,688, filed Nov. 17, 2000.

BACKGROUND OF THE INVENTION

This invention relates to the conversion of chemical energy to electrical energy. In particular, the present invention relates to a new sandwich cathode design having two cathode active materials provided on opposite sides of a current collector. The respective cathode active materials are similar in terms of, for example, their rate capability, their energy density, or some other parameter. However, one material may have an advantage over the other in one characteristic, but be disadvantageous in another.

SUMMARY OF THE INVENTION

The cathode is built in a sandwich configuration having a first one of the cathode active materials sandwiched between two current collectors. Then, a second one of the cathode active materials is provided in contact with at least the other side of one of the current collectors, and preferably facing the anode. Such a construction enables the beneficial aspects of each of the active materials to be accentuated, while diminishing their unfavorable characteristics.

Accordingly, the object of the present invention is to improve the performance of lithium electrochemical cells by providing a new concept in electrode design. The new electrode configuration is especially useful in applications where increased energy density is desired while minimizing the undesirable characteristics of the high energy density active material.

These and other objects of the present invention will become increasingly more apparent to those skilled in the art by reference to the following description.

DETAILED DESCRIPTION OF THE PREFERRED EMBODIMENTS

An electrochemical cell according to the present invention comprises an anode of a metal selected from Groups IA, IIA and IIIB of the Periodic Table of the Elements. Such anode active materials include lithium, sodium, potassium, etc., and their alloys and intermetallic compounds including, for example, Li—Si, Li—Al, Li—B, Li—Mg, and Li—Si—B alloys and intermetallic compounds. The preferred anode comprises lithium. An alternate anode comprises a lithium alloy such as a lithium-aluminum alloy. The greater the amount of aluminum present by weight in the alloy, however, the lower the energy density of the cell.

The form of the anode may vary, but preferably the anode is a thin metal sheet or foil of the anode metal, pressed or rolled on a metallic anode current collector, i.e., preferably comprising titanium, titanium alloy or nickel, to form an anode component. Copper, tungsten and tantalum are also suitable materials for the anode current collector. In the exemplary cell of the present invention, the anode component has an extended tab or lead of the same material as the anode current collector, i.e., preferably nickel or titanium, integrally formed therewith such as by welding and contacted by a weld to a cell case of conductive metal in a case-negative electrical configuration. Alternatively, the anode may be formed in some other geometry, such as a bobbin shape, cylinder or pellet to allow an alternate low surface cell design.

The electrochemical cell of the present invention further comprises a cathode of electrically conductive materials which serve as the other electrode of the cell. The cathode is preferably of solid materials and the electrochemical reaction at the cathode involves conversion of ions which migrate from the anode to the cathode into atomic or molecular forms. The solid cathode may comprise a first and a second active materials of a carbonaceous chemistry, a metal element, a metal oxide, a mixed metal oxide and a metal sulfide, and combinations thereof.

Tables 1 and 2 list various characteristics of cathode active materials typically used in high voltage lithium primary electrochemical cells including their theoretical faradic capacities.

TABLE 1

| Cathode Material *** | Molecular Weight | Valence Charge | Density (g/cc) | Theoretical Faradic Capacity (cathode only) | |
|---|---|---|---|---|---|
| | | | | Ah/g | Ah/cc |
| $(CF)_n$ | $(31)_n$ | 1 | 2.70 | 0.86 | 2.32 |
| $CuCl_2$ | 134.5 | 2 | 3.10 | 0.40 | 1.22 |
| $CuF_2$ | 101.6 | 2 | 2.90 | 0.53 | 1.52 |
| $MnO_2$ | 86.9 | 1 | 5.00 | 0.31 | 1.54 |
| $MoO_3$ | 143 | 1 | 4.50 | 0.19 | 0.84 |
| AgCl | 143.3 | 1 | 5.60 | 0.19 | 1.04 |
| $AgCrO_4$ | 331.8 | 2 | 5.60 | 0.16 | 0.9 |
| $Ag_2V_4O_{11}$ | 595.4 | 7 | 4.34 | 0.32 | 1.37 |
| $V_2O_5$ | 181.9 | 1 | 3.60 | 0.15 | 0.53 |

TABLE 2

| Cathode Material *** | Cell Reaction Mechanism (with Li anode) | Voltage (V) | Theoretical cell Energy Density Wh/kg | Energy Density Wh/L** | Average Running Voltage (V) Calculated* |
|---|---|---|---|---|---|
| $(CF)_n$ | $nLi + (CF)_n \rightarrow nLiF + nC$ | 3.10 | 2180 | 5881 | 2.53 |
| $CuCl_2$ | $2Li + CuCl_2 \rightarrow 2LiCl + Cu$ | 3.10 | 1125 | 3431 | 2.81 |
| $CuF_2$ | $2Li + CuF_2 \rightarrow 2LiF + Cu$ | 3.54 | 1650 | 4732 | 3.11 |
| $MnO_2$ | $Li + MnO_2 \rightarrow LiMnO_2$ | 3.50 | 1005 | 4993 | 3.24 |
| $MoO_3$ | $2(Li + MoO_3) \rightarrow Li_2O + Mo_2O_5$ | 2.90 | 525 | 2321 | 2.76 |
| AgCl | $Li + AgCl \rightarrow LiCl + Ag$ | 2.85 | 515 | 2819 | 2.71 |

TABLE 2-continued

| Cathode Material*** | Cell Reaction Mechanism (with Li anode) | Voltage (V) | Theoretical cell Energy Density Wh/kg | Energy Density Wh/L** | Average Running Voltage (V) Calculated*) |
|---|---|---|---|---|---|
| AgCrO$_4$ | 2Li + Ag$_2$CrO$_4$ → Li$_2$CrO$_4$ + 2Ag | 3.35 | 515 | 2897 | 3.22 |
| Ag$_2$V$_4$O$_{11}$ | 7Li + Ag$_2$V$_4$O$_{11}$ → Li7Ag$_2$V$_4$O$_{11}$ | 3.24 | 851 | 3699 | 2.70 |
| V$_2$O$_5$ | Li + V$_2$O$_5$ → LiV$_2$O$_5$ | 3.40 | 490 | 1731 | 3.27 |

*Calculated based on theoretical energy density value (WL/kg) and theoretical capacity value (Ah/g). Average running voltage = (Wh/kg)/1000 × (Ah/g).
**The value was calculated based on the calculated average running voltage (see*) and the theoretical volumentric capacity (Ah/cc).
***All values, except SVO (AgV$_4$O$_{11}$), are from Table 14.4 of "Handbook of Batteries", second edition, by David Linden. The values for SVO were determined by the present inventors.

In that respect, one preferred embodiment of the present invention includes first and second active materials which are substantially similar in one of their chemical parameters. Substantially similar is defined to mean that one of the two materials is of a chemical characteristic or parameter which is within ±10% of that parameter for the other material. An exemplary parameter is the theoretical faradic capacity. Silver vanadium oxide has a theoretical faradic capacity of 0.32 Ah/g while MnO$_2$ is of 0.31 Ah/g. These "chemically similar" materials are provided in sandwich design having the following exemplary configurations:

MnO$_2$/current collector/SVO/current collector/MnO$_2$, or

MnO$_2$/current collector/MnO$_2$/SVO/MnO$_2$/current collector/MnO$_2$, or

SVO/current collector/MnO$_2$/current collector/SVO, or

SVO/current collector/SVO/MnO$_2$/SVO/current collector/SVO.

In these cathode configurations, the rate capability and the energy density of SVO and MnO$_2$ are very similar. Sometimes, however, it is advantageous to use one material over another. That is, one material has an advantage over the other in one characteristic, but is disadvantageous in another. For example, Li/SVO cells are known to possess relatively high rate capability, but relatively low energy density in comparison to Li/CF$_x$ cells. However, Li/SVO cells are prone to Rdc and voltage delay problems, especially as they approach end-of-life discharge. On the other hand, Li/MnO$_2$ cells have nearly as good of rate capability as Li/SVO cells with diminished Rdc and voltage delay, but are known to have cell swelling problems. By using the cathode configuration of: MnO$_2$/current collector/SVO/current collector/ MnO$_2$, the MnO$_2$ layer is kept relatively thin to minimize the total amount of this material inside the cell, therefore minimizing swelling. The SVO layer is kept relatively thick to maintain a relatively robust rate capability. Since SVO is sandwiched between two layers of MnO$_2$ and does not oppose the anode directly, voltage delay and Rdc growth problems normally associated with SVO are minimized.

Another embodiment of the present invention is directed to a sandwich cathode of the distinct phases of SVO. While silver vanadium oxide has the general formula Ag$_x$V$_2$O$_y$, it is known to exist is distinct phases, i.e., β-phase having in the general formula x=0.35 and y=5.18, γ-phase having in the general formula x=0.80 and y=5.40 and ε-phase having in the general formula x=1.0 and y=5.5. For a more detailed description of such cathode active materials reference is made to U.S. Pat. No. 4,310,609 to Liang et al. and U.S. Pat. No. 5,545,497 to Takeuchi et al., both of which are assigned to the assignee of the present invention and incorporated herein by reference.

Then, exemplary sandwich cathodes have the following configurations:

β-phase SVO or γphase SVO or ε-phase SVO/current collector/β-phase SVO or γ-phase SVO or ε-phase SVO/current collector/β-phase SVO or γ-phase SVO or ε-phase SVO, wherein the SVO phase intermediate the current collectors is not the same as that contacting either outer side of the current collectors and wherein the SVO phase contacting the two outer surfaces of the current collectors is either the same or different.

Still additional embodiments have the following configurations:

MnO$_2$/current collector/SVO, wherein the MnO$_2$ faces the anode comprised of lithium, or SVO/current collector/MnO$_2$, wherein the SVO faces the anode comprised of lithium.

Before fabrication into a sandwich electrode for incorporation into an electrochemical cell according to the present invention, the first and second cathode active materials prepared as described above are preferably mixed with a binder material such as a powdered fluoro-polymer, more preferably powdered polytetrafluoroethylene or powdered polyvinylidene flouride present at about 1 to about 5 weight percent of the cathode mixture. Further, up to about 10 weight percent of a conductive diluent is preferably added to the cathode mixture to improve conductivity. Suitable materials for this purpose include acetylene black, carbon black and/or graphite or a metallic powder such as powdered nickel, aluminum, titanium and stainless steel. The preferred cathode active mixture thus includes a powdered fluoropolymer binder present at about 3 weight percent, a conductive diluent present at about 3 weight percent and about 94 weight percent of the cathode active material.

Cathode components for incorporation into an electrochemical cell according to the present invention may be prepared by rolling, spreading or pressing the first and second cathode active materials onto a suitable current collector selected from the group consisting of stainless steel, titanium, tantalum, platinum, gold, aluminum, cobalt nickel alloys, highly alloyed ferritic stainless steel containing molybdenum and chromium, and nickel-, chromium-, and molybdenum-containing alloys. The preferred current collector material is titanium, and most preferably the titanium cathode current collector has a thin layer of graphite/carbon paint applied thereto.

In order to prevent internal short circuit conditions, the sandwich cathode is separated from the Group IA, IIA or IIIB anode by a suitable separator material. The separator is of electrically insulative material, and the separator material also is chemically unreactive with the anode and cathode active materials and both chemically unreactive with and insoluble in the electrolyte. In addition, the separator material has a degree of porosity sufficient to allow flow there through of the electrolyte during the electrochemical reaction of the cell. Illustrative separator materials include fabrics woven from fluoropolymeric fibers including polyvinylidine fluoride, polyethylenetetrafluoroethylene, and polyethylenechlorotrifluoroethylene used either alone or laminated with a fluoropolymeric microporous film, non-woven glass, polypropylene, polyethylene, glass fiber materials, ceramics, polytetrafluoroethylene membrane commercially available under the designation ZITEX (Chemplast Inc.), polypropylene membrane commercially available under the designation CELGARD (Celanese Plastic Company, Inc.) and a membrane commercially available under the designation DEXIGLAS (C. H. Dexter, Div., Dexter Corp.).

The electrochemical cell of the present invention further includes a nonaqueous, ionically conductive electrolyte which serves as a medium for migration of ions between the anode and the cathode electrodes during the electrochemical reactions of the cell. The electrochemical reaction at the electrodes involves conversion of ions in atomic or molecular forms which migrate from the anode to the cathode. Thus, nonaqueous electrolytes suitable for the present invention are substantially inert to the anode and cathode materials, and they exhibit those physical properties necessary for ionic transport, namely, low viscosity, low surface tension and wettability.

A suitable electrolyte has an inorganic, ionically conductive salt dissolved in a nonaqueous solvent, and more preferably, the electrolyte includes an ionizable alkali metal salt dissolved in a mixture of aprotic organic solvents comprising a low viscosity solvent and a high permittivity solvent. The inorganic, ionically conductive salt serves as the vehicle for migration of the anode ions to intercalate or react with the cathode active materials. Known lithium salts that are useful as a vehicle for transport of alkali metal ions from the anode to the cathode include $LiPF_6$, $LiBF_4$, $LiAsF_6$, $LiSbF_6$, $LiClO_4$, $LiO_2$, $LiAlCl_4$, $LiGaCl_4$, $LiC(SO_2CF_3)_3$, $LiN(SO_2CF_3)_2$, LiSCN, $LiO_3SCF_3$, $LiC_6F_5SO_3$, $LiO_2CCF_3$, $LiSO_6F$, $LiB(C_6H_5)_4$, $LiCF_3SO_3$, and mixtures thereof.

Low viscosity solvents useful with the present invention include esters, linear and cyclic ethers and dialkyl carbonates such as tetrahydrofuran (THF), methyl acetate (MA), diglyme, trigylme, tetragylme, dimethyl carbonate (DMC), 1,2-dimethoxyethane (DME), 1,2-diethoxyethane (DEE), 1-ethoxy, 2-methoxyethane (EME), ethyl methyl carbonate, methyl propyl carbonate, ethyl propyl carbonate, diethyl carbonate, dipropyl carbonate, and mixtures thereof, and high permittivity solvents include cyclic carbonates, cyclic esters and cyclic amides such as propylene carbonate (PC), ethylene carbonate (EC), butylene carbonate, acetonitrile, dimethyl sulfoxide, dimethyl formamide, dimethyl acetamide, γ-valerolactone, γ-butyrolactone (GBL), N-methyl-pyrrolidinone (NMP), and mixtures thereof.

In the present invention, the preferred anode is lithium metal and the preferred electrolyte is 0.8M to 1.5M $LiAsF_6$ or $LiPF_6$ dissolved in a 50:50 mixture, by volume, of propylene carbonate as the preferred high permittivity solvent and 1,2-dimethoxyethane as the preferred low viscosity solvent.

Cathodes prepared as described above may be in the form of one or more plates operatively associated with at least one or more plates of anode material, or in the form of a strip wound with a corresponding strip of anode material in a structure similar to a "jellyroll". In such a jellyroll or "wound element cell stack", the anode is on the outside of the roll to make electrical contact with the cell case in a case-negative configuration. Using suitable top and bottom insulators, the wound cell stack is inserted into a metallic case of a suitable size dimension. The metallic case may comprise materials such as stainless steel, mild steel, nickel-plated mild steel, titanium, tantalum or aluminum, but not limited thereto, so long as the metallic material is compatible for use with components of the cell.

The cell header comprises a metallic disc-shaped body with a first hole to accommodate a glass-to-metal seal/terminal pin feedthrough and a second hole for electrolyte filling. The glass used is of a corrosion resistant type having up to about 50% by weight silicon such as CABAL 12, TA 23, FUSITE 425 or FUSITE 435. The positive terminal pin feedthrough preferably comprises titanium although molybdenum, aluminum, nickel alloy, or stainless steel can also be used. The cell header is typically of a material similar to that of the case. The positive terminal pin supported in the glass-to-metal seal is, in turn, supported by the header, which is welded to the case containing the electrode assembly. The cell is thereafter filled with the electrolyte solution described hereinabove and hermetically sealed such as by close-welding a stainless steel ball over the fill hole, but not limited thereto.

As is well known to those skilled in the art, the exemplary electrochemical systems of the present invention can also be constructed in case-positive configuration.

It is appreciated that various modifications to the inventive concepts described herein may be apparent to those of ordinary skill in the art without departing from the spirit and scope of the present invention as defined by the appended claims.

What is claimed is:

1. An electrochemical cell, which comprises:
   a) an anode;
   b) a cathode of a first current collector and a second current collector, each having opposed inner and outer major surfaces contactable with a cathode active material, wherein a first cathode active material of a first theoretical faradic capacity (Ah/g) is positioned between the first and second current collectors with at least the outer major surfaces of the first and second current collectors being contacted by second and third silver vanadium oxides as second and third cathode active materials having their respective second and third theoretical faradic capacities being within ±10% of the first theoretical faradic capacity, wherein the second and third silver vanadium oxides are different and all cathode active materials are selected from the group consisting of $MnO_2$, β-phase silver vanadium oxide ($Ag_{0.35}V_2O_{5.18}$), γ-phase silver vanadium oxide ($Ag_{0.80}V_2O_{5.40}$), and ε-phase silver vanadium oxide ($Ag_{1.0}V_2O_{5.5}$); and
   c) an electrolyte activating the anode and the cathode.

2. The electrochemical cell of claim 1 wherein the anode is of an alkali metal.

3. The electrochemical cell of claim 1 wherein the first cathode active material is $MnO_2$ and the cathode has the configuration: second silver vanadium oxide/first current collector/$MnO_2$/second current collector/third silver vanadium oxide.

4. The electrochemical cell of claim 1 wherein the first cathode active material is $MnO_2$ and the cathode has the configuration: second silver vanadium oxide/first current collector/silver vanadium oxide/$MnO_2$/silver vanadium oxide/second current collector/third silver vanadium oxide.

5. The electrochemical cell of claim 1 wherein the cathode has the configuration: second silver vanadium oxide selected from the group consisting of β-phase silver vanadium oxide, γ-phase silver vanadium oxide, and ε-phase silver vanadium oxide/first current collector/first cathode active material selected from the group consisting of β-phase silver vanadium oxide, γ-phase silver vanadium oxide, and ε-phase silver vanadium oxide/second current collector/third silver vanadium oxide selected from the group consisting of β-phase silver vanadium oxide, γ-phase silver vanadium oxide, and ε-phase silver vanadium oxide.

6. The electrochemical cell of claim 5 wherein the phase of the first cathode active material intermediate the first and second current collectors is either the same or different as one of the second and third silver vanadium oxides.

7. An electrochemical cell, which comprises:
   a) an anode;
   b) a cathode of silver vanadium oxide selected from the group Consisting of β-phase silver vanadium oxide ($Ag_{0.35}V_2O_{5.18}$), γ-phase silver vanadium oxide ($Ag_{0.80}V_2O_{5.40}$), ε-phase silver vanadium oxide ($Ag_{1.0}V_2O_{5.5}$), and mixtures thereof as a first cathode active material of a first theoretical faradic capacity sandwiched between a first and second current collectors with $MnO_2$ of a second theoretical faradic capacity as a second cathode active material contacting at least the first current collector opposite the first cathode active material and facing the anode, wherein the first theoretical faradic capacity is within ±10% of the second theoretical faradic capacity; and
   c) an electrolyte activating the anode and the cathode.

8. The electrochemical cell of claim 7 wherein the cathode has the configuration: $MnO_2$/first current collector/$MnO_2$/silver vanadium oxide/$MnO_2$/second current collector/$MnO_2$.

9. The electrochemical cell of claim 7 wherein the anode is of an alkali metal and the electrolyte is of a nonaqueous chemistry.

10. The electrochemical cell of claim 7 wherein $MnO_2$ as a third cathode active material contacts the second current collector spaced from the $MnO_2$ as the second cathode active material with the silver vanadium oxide as the first cathode active material intermediate the first and second current collectors.

11. The electrochemical cell of claim 7 wherein the first and second current collectors are selected from the group consisting of stainless steel, titanium, tantalum, platinum, gold, aluminum, cobalt nickel alloys, highly alloyed ferritic stainless steel containing molybdenum and chromium, and nickel-, chromium-, and molybdenum-containing alloys.

12. The electrochemical cell of claim 7 wherein the first and second current collectors are titanium having a coating selected from the group consisting of graphite/carbon material, iridium, iridium oxide and platinum provided thereon.

13. The electrochemical cell of claim 7 wherein the electrolyte is of a nonaqueous chemistry having a first solvent selected from an ester, a linear ether, a cyclic ether, a dialkyl carbonate, and mixtures thereof, and a second solvent selected from a cyclic carbonate, a cyclic ester, a cyclic amide, and mixtures thereof.

14. The electrochemical cell of claim 13 wherein the first solvent is selected from the group consisting of tetrahydrofuran, methyl acetate, diglyme, trigylme, tetragylme, dimethyl carbonate, 1,2-dimethoxyethane 1,2-diethoxyethane, 1-ethoxy, 2-methoxyethane, ethyl methyl carbonate, methyl propyl carbonate, ethyl propyl carbonate, diethyl carbonate, dipropyl carbonate, and mixtures thereof, and the second solvent is selected from the group consisting of propylene carbonate, ethylene carbonate, butylene carbonate, acetonitrile, dimethyl sulfoxide, dimethyl formamide, dimethyl acetamide, γ-valerolactone, γ-butyrolactone, N-methyl-pyrrolidinone, and mixtures thereof.

15. The electrochemical cell of claim 13 wherein the electrolyte includes a lithium salt selected from the group consisting of $LiPF_6$, $LiBF_4$, $LiAsF_6$, $LiSbF_6$, $LiClO_4$, $LiO_2$, $LiAlCl_4$, $LiGaCl_4$, $LiC(SO_2CF_3)_3$, $LiN(SO_2CF_3)_2$, $LiSCN$, $LiO_3SCF_3$, $LiC_6F_5SO_3$, $LiO_2CCF_3$, $LiSO_6F$, $LiB(C_6H_5)_4$, $LiCF_3SO_3$, and mixtures thereof.

16. The electrochemical cell of claim 7 wherein the electrolyte is 0.8M to 1.5M $LiAsF_6$ or $LiPF_6$ dissolved in a 50:50 mixture, by volume, of propylene carbonate as the first solvent and 1,2-dimethoxyethane as the second solvent.

17. An electrochemical cell, which comprises:
   a) an anode;
   b) a cathode of a first cathode active material and a second cathode active material, wherein the first cathode active material is silver vanadium oxide of a first theoretical faradic capacity selected from the group consisting of β-phase silver vanadium oxide ($Ag_{0.35}V_2O_{5.18}$), γ-phase silver vanadium oxide ($Ag_{0.80}V_2O_{5.40}$), ε-phase silver vanadium oxide ($Ag_{2.0}V_2O_{5.5}$), and mixtures thereof having spaced apart first and second major sides with at least one current collector contacting at least one of the first and second major aides and wherein the second cathode active material is $MnO_2$ of a second theoretical faradic capacity within ±10% of the first theoretical faradic capacity contacted to the at least one current collector opposite the first cathode active material, and wherein the $MnO_2$ faces the anode; and
   c) a nonaqueous electrolyte activating the anode and the cathode.

18. A method for providing an electrochemical cell, comprising the steps of:
   a) providing an anode;
   b) providing a cathode of:
      i) a first current collector and a second current collector, each having opposed inner and outer major surfaces contactable with a cathode active material;
      ii) positioning a first cathode active material of a first theoretical faradic capacity (Ah/g) between the first and second current collectors;
      iii) contacting at least the outer major surfaces of the first and second current collectors with respective second and third silver vanadium oxides as second and third cathode active materials having their second and third theoretical faradic capacities being within ±10% of the first theoretical faradic capacity;
      iv) wherein the second and third silver vanadium oxides are different; and
      v) selecting all cathode active materials from the group consisting of $MnO_2$, β-phase silver vanadium oxide $Ag_{0.35}V_2O_{5.18}$), γ-phase silver vanadium oxide $Ag_{0.80}V_2O_{5.40}$), and ε-phase silver vanadium oxide ($Ag_{1.0}V_2O_{5.5}$); and
   c) activating the anode and the cathode with an electrolyte.

19. The method of claim 18 including providing the anode of an alkali metal.

20. The method of claim 18 including providing the cathode having the configuration: first silver vanadium oxide/first current collector/MnO$_2$/second current collector/second silver vanadium oxide.

21. The method of claim 18 including providing the cathode having the configuration: second silver vanadium oxide/first current collector/silver vanadium oxide/MnO$_2$/silver vanadium oxide/second current collector/third silver vanadium oxide.

22. The method of claim 18 including providing the cathode having the configuration: second silver vanadium oxide selected from the group consisting of β-phase silver vanadium oxide, γ-phase silver vanadium oxide, and ε-phase silver vanadium oxide/first current collector/first cathode active material selected from the group consisting of β-phase silver vanadium oxide, γ-phase silver vanadium oxide, and ε-phase silver vanadium oxide/second current collector/third silver vanadium oxide selected from the group consisting of β-phase silver vanadium oxide, γ-phase silver vanadium oxide, and ε-phase silver vanadium oxide.

23. The method of claim 22 including providing the phase of the first cathode active material intermediate the first and second current collectors being either the same or different as one of the second and third silver vanadium oxides.

24. An electrochemical cell, which comprises:
   a) an anode;
   b) a cathode of one of silver vanadium oxide (SVO) and MnO$_2$ as a first cathode active material sandwiched between a first and second current collectors with the other of SVO and MnO$_2$ as a second cathode active material contacting at least one of the current collectors opposite the first cathode active material and facing the anode, wherein the first and second current collectors are titanium having a coating selected from the group consisting of graphite/carbon material, iridium, iridium oxide and platinum provided thereon; and
   c) an electrolyte activating the anode and the cathode.

25. A method for providing an electrochemical cell, comprising the steps of:
   a) providing an anode;
   b) providing a cathode by the steps of:
      i) selecting a first silver vanadium oxide from the group consisting of β-phase silver vanadium oxide (Ag$_{0.35}$V$_2$O$_{5.18}$), γ-phase silver vanadium oxide (Ag$_{0.80}$V$_2$O$_{5.40}$), ε-phase silver vanadium oxide (Ag$_{1.0}$V$_2$O$_{5.5}$), and mixtures thereof of a first theoretical faradic capacity having spaced apart first and second major sides;
      ii) positioning at least a first current collector adjacent to at least one of the first and second major sides of the first silver vanadium oxide; and
      iii) contacting MnO$_2$ of a second theoretical faradic capacity to the at least one current collector opposite the first silver vanadium oxide and facing the anode, wherein the first theoretical faradic capacity is within ±10% of the second theoretical faradic capacity; and
   c) activating the anode and the cathode with an electrolyte.

26. The method of claim 25 including positioning a second current collector adjacent to the other major side of the first silver vanadium oxide and providing the cathode having the configuration: MnO$_2$/first current collector/MnO$_2$/silver vanadium oxide/MnO$_2$/second current collector/MnO$_2$.

27. The method of claim 25 including providing the anode being of lithium and the cathode having the configuration: MnO$_2$/current collector/silver vanadium oxide with the MnO$_2$ facing the lithium anode.

28. An electrochemical cell, which comprises:
   a) an anode;
   b) a cathode of a first current collector and a second current collector, each having opposed inner and outer major surfaces contactable with a cathode active material, wherein a first cathode active material of a first theoretical faradic capacity (Ah/g) is positioned between the first and second current collectors with at least the outer major surfaces of the first and second current collectors being contacted by second and third cathode active materials having their respective second and third theoretical faradic capacities being within ±10% of the first theoretical faradic capacity, wherein the second and third cathode active materials are different and all of the cathode active materials are selected from the group consisting of MnO$_2$, β-phase silver vanadium oxide (Ag$_{0.35}$V$_2$O$_{5.18}$), γ-phase silver vanadium oxide (Ag$_{0.80}$V$_2$O$_{5.40}$), and ε-phase silver vanadium oxide (Ag$_{1.0}$V$_2$O$_{5.5}$); and
   c) an electrolyte activating the anode and the cathode.

* * * * *

UNITED STATES PATENT AND TRADEMARK OFFICE
CERTIFICATE OF CORRECTION

PATENT NO. : 6,743,550 B2
DATED : June 1, 2004
INVENTOR(S) : Gan et al.

It is certified that error appears in the above-identified patent and that said Letters Patent is hereby corrected as shown below:

Title page,
Item [54], Title, should read:
-- DOUBLE CURRENT COLLECTOR CATHODE DESIGN USING CHEMICALLY SIMILAR ACTIVE MATERIALS FOR ALKALI METAL ELECTROCHEMICAL CELLS --;
Item [56], References Cited, U.S. PATENT DOCUMENTS, add the following:

| | | |
|---|---|---|
| -- 5,744,258 | 04/1998 | Bai et al. |
| 5,582,935 | 12/1996 | Dasgupta et al. |
| 5,667,916 | 09/1997 | Ebel et al. |
| 5,716,422 | 02/1998 | Muffoletto et al. |
| 5,180,642 | 01/1993 | Weiss et al. |
| 5,670,276 | 09/1997 | Takeuchi et al. |
| 5,571,636 | 11/1996 | Ohta et al. |
| 4,324,823 | 04/1982 | Ebato et al. |
| 3,520,729 | 07/1970 | Voss et al. |
| 4,161,063 | 07/1979 | Goebel et al. |
| 4,292,357 | 09/1981 | Erisman et al. |
| 4,409,730 | 10/1983 | Goebel |
| 4,439,916 | 04/1984 | Faber |
| 5,639,568 | 06/1997 | Pedicini et al. |
| 5,658,694 | 08/1997 | Charkey |
| 5,863,676 | 01/1999 | Charkey et al. |
| 5,993,999 | 11/1999 | Rivers et al. -- |

Column 7,
Line 3, "Consisting" should read -- consisting --;
Line 66, "1-ethoxy, 2-methoxyethane" should read -- 1-ethoxy,2-methoxyethane --;

UNITED STATES PATENT AND TRADEMARK OFFICE
CERTIFICATE OF CORRECTION

PATENT NO.    : 6,743,550 B2
DATED         : June 1, 2004
INVENTOR(S)   : Gan et al.

It is certified that error appears in the above-identified patent and that said Letters Patent is hereby corrected as shown below:

Column 8,
Line 27, "(Ag2.0V2O5.5)" should read -- Ag1.0V2O5.5 --;
Line 30, "aides" should read -- sides --;
Line 58, before "Ag0.35V2O5.18)" please insert -- ( --;
Line 59, before "Ag0.35V2O5.18)", please insert -- ( --;

Column 10,
Line 38, "active. materials" should read -- active materials --.

Signed and Sealed this

Twenty-third Day of November, 2004

JON W. DUDAS
*Director of the United States Patent and Trademark Office*